United States Patent [19]

Hirata

[11] 4,380,781

[45] Apr. 19, 1983

[54] DISC-SHAPED RECORDING MEDIUM REPRODUCING APPARATUS

[75] Inventor: Atsumi Hirata, Fujisawa, Japan

[73] Assignee: Victor Company of Japan, Ltd., Yokohama, Japan

[21] Appl. No.: 244,058

[22] Filed: Mar. 16, 1981

[30] Foreign Application Priority Data

Mar. 17, 1980 [JP] Japan ................. 55/32718

[51] Int. Cl.³ ............... G11B 5/012; G11B 5/016; G11B 23/02; G11B 5/52
[52] U.S. Cl. ..................... 360/97; 360/86; 360/99; 360/133
[58] Field of Search ............. 360/86, 97, 99, 133, 360/135, 137

[56] References Cited

U.S. PATENT DOCUMENTS

| | | | |
|---|---|---|---|
| 3,959,823 | 5/1976 | Heidecker | 360/99 |
| 4,145,726 | 3/1979 | Conaty | 360/133 |
| 4,239,238 | 12/1980 | Coleman | 360/86 |
| 4,266,784 | 5/1981 | Torrington | 360/133 |
| 4,275,426 | 6/1981 | Hoffman | 360/99 |
| 4,301,486 | 11/1981 | Brown | 360/99 |

FOREIGN PATENT DOCUMENTS

1455449 11/1976 United Kingdom .
2015235A 9/1979 United Kingdom .

*Primary Examiner*—Robert M. Kilgore
*Attorney, Agent, or Firm*—Louis Bernat

[57] ABSTRACT

A reproducing apparatus reproduces a disc-shaped recording medium which is accommodated within a case comprising a jacket which has a space for accommodating the disc-shaped recording medium and an opening for allowing the disc-shaped recording medium to go in and out of the jacket, and a lid member inserted through the opening of the jacket for closing the opening of the jacket, where the lid member has cutouts and ride-over parts. The reproducing apparatus comprises an inserting opening through which the case is inserted, a turntable for rotating the disc-shaped recording medium, a clamping mechanism for clamping at least one of the disc-shaped recording medium and the lid member provided at an innermost part on the opposite side from the inserting opening with respect to the turntable, a detecting mechanism for detecting whether the disc-shaped recording medium is loaded within the reproducing apparatus, a reproducing transducer for reproducing the disc-shaped recording medium placed on the turntable, a reproducing operation mechanism for moving the reproducing transducer from a waiting position to a reproducing position with respect to the disc-shaped recording medium to perform a reproducing operation, and an operating mechanism connected to the detecting mechanism and the reproducing operation mechanism and operated upon starting of the reproducing operation, for operating the reproducing operation mechanism only when operated in a state where the detecting mechanism is detecting whether a disc-shaped recording medium is loaded within the reproducing apparatus.

5 Claims, 3 Drawing Figures

DISC-SHAPED RECORDING MEDIUM REPRODUCING APPARATUS

BACKGROUND OF THE INVENTION

The present invention generally relates to disc-shaped recording medium reproducing apparatuses, and more particularly to a disc-shaped recording medium reproducing apparatus capable of placing and leaving a disc-shaped recording medium in a state possible for reproduction within the reproducing apparatus when a case having a lid for accommodating the disc-shaped recording medium therein is inserted into and then pulled out from within the reproducing apparatus, and also capable of preventing the reproducing operation from starting even when a play button is operated in a state where a disc-shaped recording medium is not inserted within the reproducing apparatus.

Conventionally, in an apparatus for reproducing a disc-shaped recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc case which has a lid and accommodates a disc therein, from within the reproducing apparatus. In this type of an apparatus, it is impossible to directly confirm whether the disc is loaded within the reproducing apparatus with the first side (side A) or the second side (side B) as the side to be reproduced, since the reproducing apparatus is constructed so that the disc cannot be seen directly from outside the reproducing apparatus. Accordingly, it is highly desirable that a display is made to indicate which side of the disc is inserted as the side to be reproduced.

Therefore, in a reproducing apparatus provided with means for displaying the reproducing side of the disc being loaded as described above, when the display part respective of either one of the above first or the second side is lit up, the operator can see that a disc is loaded within the reproducing apparatus by looking at this reproducing side display part.

Hence, when the reproducing side display part is not lit up although the voltage source is turned ON, this indicates that a disc is loaded within the reproducing apparatus. Accordingly, when the operator confirms that the display part is not lit up by looking at the display part upon starting of the reproduction, it can be seen that a disc is not loaded within the reproducing apparatus.

However, there are times when the operator pushes the play button to erroneously start reproduction although a disc is not loaded within the reproducing apparatus, without confirming the display part and mistakenly thinking that a disc is loaded within the reproducing apparatus. Therefore, the reproducing apparatus is put into a reproducing operation state when an erroneous operation is performed as described above, and the pickup device is moved to the reproduction starting position to lower the reproducing stylus onto the turntable which does not have a disc placed thereon. Since the turntable is being rotated at high speed upon this state, the reproducing transducer including the reproducing stylus becomes damaged.

SUMMARY OF THE INVENTION

Accordingly, a general object of the present invention is to provide a novel and useful disc-shaped recording medium reproducing apparatus in which the above described problems have been overcome.

Another and more specific object of the present invention is to provide a disc-shaped recording medium reproducing apparatus constructed so that even when an attempt is made to perform a play (reproducing) operation in a state where a disc is not loaded within the reproducing apparatus, the reproducing apparatus is not put into a playing (reproducing) state (mode). According to the reproducing apparatus of the present invention, the generation of an accident is prevented, in which the reproducing apparatus is put into the playing state to lower the reproducing stylus onto the turntable although a disc is not placed on the turntable and the reproducing stylus is resultingly damaged by the rotating turntable.

Other objects and further features of the present invention will be apparent from the following detailed description when read in conjunction with the accompanying drawings.

BRIEF DESCRIPTION OF THE DRAWINGS

FIG. 3 is a circuit diagram showing an essential part of the reproducing apparatus according to the present invention.

DETAILED DESCRIPTION

Figure 1:
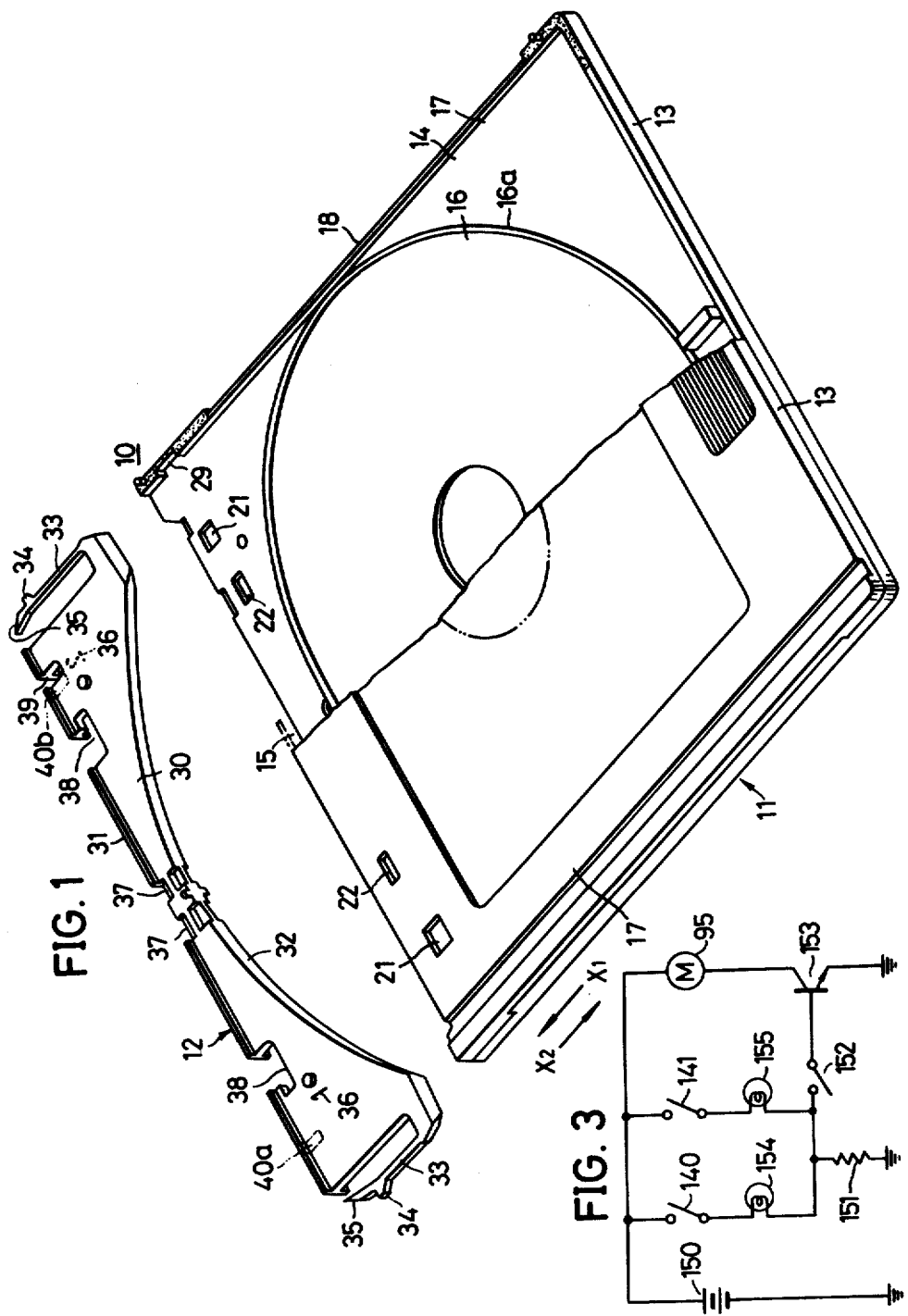
FIG. 1 is a perspective view showing an example of a disc case which operates together with a disc reproducing apparatus according to the present invention, with a part cut away and disassembled.

FIG. 1 shows an example of a disc case which operates together with a disc reproducing apparatus of the present invention, where a disc case 10 comprises a jacket 11 and a lid plate 12.

The jacket 11 is assembled from a pair of jacket halves 13 and 13, and comprises a flat cavity or space 14 therein. This space 14 is open at an opening 15 at the front side of the jacket 11 and is closed on the other three sides, and accommodates a disc 16. The jacket halves 13 are, for example, made of styrol resin, and have a preferable flexibility so as to allow the enlarging of the opening 15, and also have a suitable hardness to protect the disc 16 accommodated therein.

Each of the jacket halves 13 comprises a flat plate part 17 and ribs 18 which are unitarily formed with the flat plate part 17 and are continuous in the three sides. A display window 21 and a pair of engaging windows 22 are provided on the flat plate part 17. The lid plate 12 comprises a plate-shaped main lid body 30 which is inserted into the front portion of the space 14 through the opening 15 of the jacket 11 and closes the opening 15, and a rim portion 31 formed unitarily at the front edge of the main lid body 30, which is fixed to the front edge of the jacket 11 and does not enter within the opening 15. The lid plate 12 is, for example, made of acrylonitrile butadiene styrene (ABS) resin. An arcuate part 32 having a radius of curvature larger than the radius of the disc 16, is formed at the rear end part of the main lid body 30. A pair of engaging arms 33 are formed on both sides of the main lid body 30. A projection 34 which engages with a depression 29 of the jacket 11, is provided at the outer side on each of the engaging arm 33, and a sloping surface 35 is formed at the tip end on each of the engaging arm 33. The base portions of the engaging arms 33 are unitarily formed on the rear end of the main lid body 30 and extend in the forward direction, while the free ends of the engaging arms 33 can undergo resilient distortion. Upon insertion of the lid plate 12 into a predetermined position within the jacket 11, the projection 34 engages into the depression 29 in the side wall of the jacket 11, due to the flexibility of the engaging arm 33. Accordingly, the lid plate 12 is prevented from slipping out from the jacket 11.

A display 36 which displays a "1" or a "2" (or, "A" or "B") to indicate the side of the disc 16, is respectively provided at a position corresponding to the position of the display window 21, on the upper and lower surfaces of the main lid body 30. Clamping finger ride-over parts 37 are respectively formed at the central parts of the main lid body 30 so that a clamping finger of the reproducing apparatus can easily ride over the clamping finger ride-over parts 37.

A pair of L-shaped cutouts 38 are formed at the front end of the main lid body 30 through the rim portion 31. As will be described later, a lid plate locking finger and a jacket opening enlarging finger of the reproducing apparatus are inserted into the cutouts 38. Further, a cutout 39 wherein a disc surface discriminating switch is inserted, is formed at the outer side of one of the cutouts 38, extending from the rim portion 31 into the main lid body 30.

Figure 2:
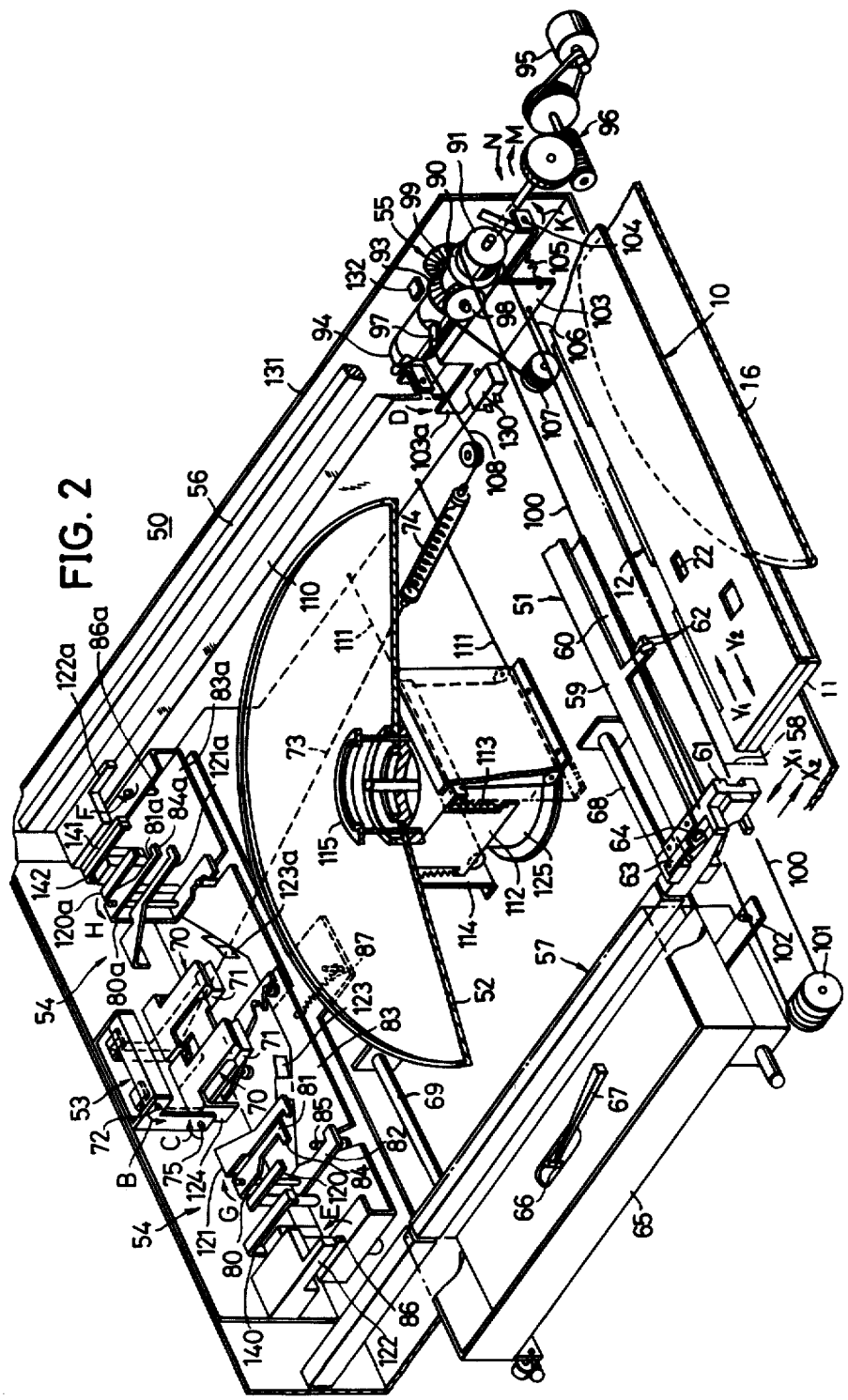
FIG. 2 is a perspective view showing the inner construction of a disc reproducing apparatus according to the present invention, with a part cut away.

As shown in FIG. 2, a reproducing apparatus 50 substantially comprises a jacket opening enlarging mechanism 51, a turntable 52 to rotate the disc 16 positioned thereon, a disc clamping mechanism 53 for clamping the disc 16, a lid plate locking mechanism 54 for locking the lid plate 12, a differential gear device 55, and the like.

Both sides of the jacket opening enlarging mechanism 51 are guided by guide rails 56 and 57, and the enlarging mechanism 51 moves between the innermost part of the reproducing apparatus 50 and a disc case inserting opening 58 provided at the frame of the reproducing apparatus 50, in the directions of the arrows X1 and X2. Upper and lower beams 59 and 60 extend in the directions of the arrows Y1 and Y2 as shown in FIG. 2, and both ends of the respective beams 59 and 60 are supported by supporting members (sliders) 61 (one of the sliders is not shown). These sliders 61 are respectively fixedly inserted into the guide rails 56 and 57. Enlarging fingers 62 are respectively formed on each of the beams 59 and 60, in a direction facing the inserting opening 58 of the reproducing apparatus 50. When the enlarging fingers 62 are positioned on the side of the inserting opening 58, a roller 64 enters inside a tapered depression, due to the action of a leaf spring 63. When the beams 59 and 60 move in the direction of the arrow X1, the roller 64 rides over the tapered depression, and the enlarging fingers 62 rotate in upward and downward directions so as to mutually separate from each other.

A pickup frame 65 is provided with a reproducing stylus 66 and a cantilever 67, and moves in the directions of the arrows Y1 and Y2 along guide rods 68 and 69.

The disc clamping mechanism 53 and the lid plate locking mechanism 54 are constructed symmetrically on the left and right sides with respect to a line which passes through the center of the turntable in the direction of the arrow X1. The parts on one side are designated by the same reference numerals as the corresponding parts on the other side, with a subscript "a", and their description will be omitted.

The disc clamping mechansim 53 is provided at the inner part of the reproducing apparatus 50 on the opposite side of the inserting opening 58, and comprises a pair of upper and lower clamping fingers 70 and 71. The lower clamping finger 71 is axially supported by a shaft 72. A wire 73 is connected to the clamping finger 71, and the clamping finger 70 receives a rotational force in the direction of arrow B due to a force of a spring mechanism 74. Accordingly, the clamping finger 70 receives a force urging rotation in the upward direction. The upper clamping finger 70 is axially supported by a pin 75.

In the lid plate locking mechanism 54, a locking member 80 comprises an upper locking finger 81 and a lower cam finger 82, and is axially supported by a pin embeddedly formed on a main lever 83. An L-shaped part 84 is formed at the tip end of the locking finger 81, and a cam which operates together with a pin 85 is formed on the cam finger 82.

The main lever 83 is axially supported by a shaft 86, and is urged to rotate in the clockwise direction by a spring 87. Furthermore, the main lever 83 is linked to the other main lever 83a and the two levers 83 and 83a rotate in mutually opposite directions.

In the differential gear device 55, a bevel gear 90 and a drum 91 are unitarily constructed, and are rotatably supported by a driving shaft 92. Similarly, a bevel gear 93 and a take-up drum 94 are unitarily constructed, and are rotatably supported by the driving shaft 92. The take-up drum 94 comprises a tubular part and a semi-circular cross section part. The driving shaft 92 is rotated by a motor 95 through a worm gear mechanism 96.

A pickup frame moving wire belt 100 is strung between the drum 91 and a drum 101 (a part therebetween is omitted in FIG. 2). An arm 102 which projects out from the pickup frame 65, is fixed to a part of the wire belt 100.

A rotary plate 103 is axially supported by a shaft 104, and is urged to rotate in the direction of arrow K by a spring 105. A wire 106 is strung between the rotary plate 103 and a pin 97 embedded in the take-up drum 94, through a pulley 107.

A wire 108 is wound and fixed to the semi-circular cross section part of the take-up drum 94. In addition, the above spring mechanism 74 is provided between the wires 108 and 73.

Upon reproduction of the disc 16, the disc case 10 is inserted through the inserting opening 58 of the reproducing apparatus 50, by inserting the disc case 10 with the side of the lid plate 12 into the direction of the arrow X1. When the jacket opening enlarging mechanism 51 is pushed and moved in the direction of the arrow X1 by the disc case 10, the roller 64 slips out of the tapered part to rotate the upper and lower beams 59 and 60, and the enlarging fingers 62 thus respectively move in directions to mutually separate from each other. Accordingly, the tip ends of the enlarging fingers 62 engage with the engaging windows 22 of the jacket 11, and enlarge the front part of the upper and lower jacket halves 13 upwards and downwards, to enlarge the opening 15.

Furthermore, a sloping surface of a rotary plate 110 is pushed by a roller (not shown) provided on the slider, and the rotary plate 110 rotates in the direction of the arrow D, due to the movement of the jacket opening enlarging mechanism 51. Accompanied by the rotation of the rotary plate 110, a wire 111 is pulled, and a push-up plate 112 is accordingly pulled downwards. Four corners of the push-up plate 112 are suspended and supported by springs 113 with respect to a support plate 114. Due to the downward movement of the push-up plate 112, a push-up body 115 which is capable of unitarily rotating with the turntable 52 and moving up and down, moves downwards, to retreat from the insertion passage of the disc case 10.

When the disc case 10 is inserted into the innermost part of the reproducing apparatus 50 together with the enlarging mechanism 51 through the upper side of the turntable 52, the ride-over parts 37 of the lid plate 12 enter between clamping parts which are positioned mutually opposite to the clamping fingers 70 and 71, and pass through these clamping parts by pushing and spreading these parts. The clamping fingers 70 and 71 close after the ride-over parts 37 of the lid plate 12 have passed through, and the clamping parts accordingly clamp the groove guard 16a of the disc 16.

Accompanied by the insertion of the disc case 10, the locking fingers 81 and 81a relatively enter inside the cutouts 38 of the lid plate 12, and the rim portion 31 accordingly pushes contact fingers 120 and 120a. When the contact fingers 120 and 120a are pushed by the lid plate 12, the main levers 83 and 83a respectively rotate in the directions of the arrows E and F. Due to the above rotation of the main lever 83, the cam of the cam finger 82 is guided by the pin 85, and the locking member 80 accordingly rotates in the direction of the arrow G. Similarly, the locking member 80a rotates in the direction of the arrow H due to the rotation of the main lever 83a. Hence, the locking fingers 81 and 81a rotate in directions so as to mutually separate from each other, and the L-shaped parts 84 and 84a provided at the tip ends of the above locking fingers 81 and 81a respectively enter into the innermost parts of the cutouts 38, to lock the lid plate 12. The lid plate 12 is restricted of its movement in the direction of the arrow X1 by the contact fingers 120 and 120a, and the lid plate 12 is thus locked and supported at the innermost part of the reproducing apparatus 50 in a state in which the lid plate 12 is placed and supported on supporting fingers 121 and 121a.

Furthermore, engagement releasing members 122 and 122a enter inside the openings on the left and right sides of the disc case 10, and push the sloping surfaces 35 at the tip ends of the engaging arms 33. Accordingly, the engaging arms 33 respectively are distorted inwards, and the projections 34 respectively slip out from the depressions 29, to release the engagement of the lid plate 12 with respect to the jacket 11.

When the main levers 83 and 83a rotate to positions where they are latched, leaf springs 123 and 123a respectively provided at the bent parts of the main levers push against a vertically extending part 124 of the upper clamping fingers 70. Hence, a rotational force in the direction of the arrow C is applied to the clamping fingers 70. Thus, the disc 16 is clamped at a predetermined height by the lower clamping finger 71 and the upper clamping fingers 70.

Accordingly, when the disc case 10 is inserted into the final position, the engagement of the lid plate 12 with respect to the jacket 11 is released, and the disc 16 thus becomes clamped by the clamping fingers 70 and 71.

Next, the jacket 11 is pulled out in the direction of the arrow X2. Since the lid plate 12 and the disc 16 are respectively locked and clamped as described above, only the jacket 11 is moved in the direction of the arrow X2, leaving behind the lid plate 12 and the disc 16. Accompanied by this pulling out of the jacket 11, the lid plate 12 and the disc 16 are relatively pulled out from within the jacket 11. Because the opening 15 of the jacket 11 is in an enlarged state then, there is no possibility of the disc 16 being scratched by sliding against the inner surfaces of the jacket 11.

Accompanied by the movement of the jacket 11 in the direction of the arrow X2, the jacket opening enlarging mechanism 51 also moves together with the jacket in the direction of the arrow X2, since the step part of the jacket opening enlarging fingers 62 engages with the engaging windows 22 of the jacket 11. When the jacket 11 is pulled out to the vicinity of the inserting opening 58, the rotary plate 110 rotationally returns due to a spring and the push-up body 115 moves up to support the center part of the disc 16. Furthermore, when the jacket 11 is pulled out, the disc 16 completely separates from the jacket 11, the jacket opening enlarging mechanism 51 returns to its original position, and the jacket opening enlarging fingers 62 rotate in directions so as to mutually close upon each other and separate from the engaging windows 22. The jacket 11 returns to its original state due to its flexibility, and the enlarged opening 15 also returns to the original state, and the jacket 11 is completely pulled out from the reproducing apparatus 50. In this state, the disc 16 is supported horizontally at a position above the turntable 52, by the clamping fingers 70 and 71 and the push-up body 115. In this state, a detection switch 130 is pushed by the rotary plate 103 and turned ON.

When a play button (not shown) is then pushed, a motor 125 rotates to start rotating the turntable 52. Furthermore, as will be described hereinafter, the motor 95 also starts to rotate, and the driving shaft 92 rotates in the direction of the arrow M. Accordingly, the bevel gear 93 and the take-up drum 94 having small loads are first rotated in the direction of the arrow M, and the wire 108 is loosened. Thus, the clamping of the disc by the disc clamping mechanism 53 is released. In addition, the wire 106 is loosened due to the rotation of the drum 94, and the rotary plate 103 rotates in the direction of the arrow K due to the spring 105. Therefore, the rotary plate 110 is pushed by the extending arm 103a of the rotary plate 103, and the push-up body 115 moves downwards. Hence, the disc 16 which is released from the clamping moves downwards together with the push-up body 115, and is rotated by the rotating turntable 52.

When the take-up drum 94 rotates by a predetermined angle, the pin 97 hits a fixed fin 132 fixed on a right side wall 131, to limit the rotation. Thus, the rotational load of the bevel gear 93 and the take-up drum 94 become larger than that of the bevel gear 90 and the drum 91, and the bevel gear 90 and the drum 91 then start to rotate in the direction of the arrow M. Due to this rotation of the drum 91, the wire 100 travels, and the pickup frame 65 is thus moved at high speed in the direction of the arrow Y1, and the reproduction of the disc 16 is performed by the reproducing stylus 66. Moreover, the moving of the pickup frame 65 upon reproduction is also performed by the above motor 95.

Next, returning to the description concerning the loading of the disc 16 upon insertion of the disc 10 into the reproducing apparatus 50, the essential parts of the reproducing apparatus according to the present invention will now be described in conjunction with FIGS. 1 through 3.

A first side detection switch 140, a second side detection switch 141, disc type discriminating switch 142 are respectively provided at predetermined positions at the innermost part of the reproducing apparatus 50. In the above embodiment of the invention, the lid plate 12 is for a video disc, and in the state shown in FIG. 1, the lid plate 12 and the disc 16 have their first sides facing up. When the disc case 10 is inserted within the reproducing apparatus 50 in this state, the switches 140 and 142 are pushed by the rim portion 31 of the lid plate 12 and are closed. The switch 141 enters the cutout 39 of the lid plate 12 and is in the open state. It is detected that the disc 16 is loaded with the first side facing up by the closing of the switch 140, and further, it is detected that the disc 16 is a video disc by the closing of the switch 142.

When the disc case 10 is inserted into the reproducing apparatus 50 with the sides reversed from the above state, with the second side of the disc 16 facing up, the switch 140 is in the open state since the cutout 39 of the lid plate 12 is positioned at the left side in FIG. 1. However, the switch 141 is pushed by the rim portion 31 of the lid plate 12 and is closed, to detect the second side of the disc 16.

When using a PCM audio disc as the disc 16, a lid plate additionally provided with cutouts 40a and 40b shown by two-dot chain line in FIG. 1 on symmetrical positions on the left and right, is used. In this case, even when the disc case 10 is inserted into the innermost part of the reproducing apparatus 50, the discriminating switch 142 enters within the cutout 40a or 40b and is in the open state. Accordingly, it is detected that the disc inserted is a PCM audio disc. The detection of the sides of the disc is performed in the same manner as in the case of the above described video disc.

In FIG. 3, the switches 140 and 141 are respectively connected in series with lamps 154 and 155, and the two respective open ends of the respective series connected elements are connected together, to form a parallel connection. One end of this parallel circuit is connected to a voltage source 150. On the other hand, the other end of the parallel circuit is connected to ground through a resistor 151, and is also connected to the base of a transistor 153 of the emitter-grounded type through a switch 152. The motor 95 is connected between the collector of the transistor 153 and the voltage source 150.

When the disc case 10 is inserted into the predetermined innermost position within the reproducing apparatus 50 with the first side of the disc 16 facing up as described above, the switch 140 closes and the lamp 154 lights up, to indicate that the disc 16 is loaded within the reproducing apparatus with the first side as the side to be reproduced. At this point, the switch 141 remains open, and the lamp 155 remains unlit.

A certain voltage is generated between the terminals of the resistor 151, due to the closing of the switch 140. Thus, when the play button is pushed, the play switch 152 closes, to apply a positive voltage to the base of the transistor 153. Accordingly, the transistor 153 becomes ON, and the motor 95 starts to rotate due to the voltage applied thereto. Therefore, the pickup frame 65 is moved as described above, and the first side of the disc 16 is thus reproduced.

On the other hand, when the disc case 10 is inserted into the innermost part within the reproducing apparatus 50 with the second side of the disc 16 facing up, the switch 141 closes and the lamp 155 lights up, to indicate that the second side of the disc 16 is loaded as the side to be reproduced. At this point, the switch 140 remains open, and the lamp 154 remains unlit.

Due to the closing of the switch 141, a certain voltage is generated between the terminals of the resistor 151. When the play button is pushed in this state, the play switch 152 becomes closed, and a positive voltage is applied to the base of the transistor 153. Accordingly, the transistor 153 becomes ON, and a voltage is applied to the motor 95 to start rotating the motor 95. Therefore, the pickup frame 65 is moved as described above, and the second side of the disc 16 is thus reproduced.

Hence, in a state where the disc 16 is not loaded within the reproducing apparatus 50, the switches 140 and 141 remain open since the lid plate 12 is also not inserted within the reproducing apparatus 50. In this state, the lamps 154 and 155 remain unlit, and no voltage is introduced between both terminals of the resistor 151. Accordingly, even when the play button is pushed to close the switch 152 in this state, no voltage is applied to the base of the transistor 153. Thus, the transistor 153 remains in the OFF state, and the motor 95 does not rotate.

Therefore, even when the operator erroneously pushes the play button to close the play switch 152 in a state where the disc 16 is not loaded within the reproducing apparatus 50, an accident in which the reproducing stylus 66 is damaged due to the movement of the pickup frame 65 by the rotation of the motor 95 to lower the reproducing stylus 66 onto the turntable 52.

The present invention is not only reduced into practice with respect to an apparatus having a mechanism which operates together with a disc case comprising a jacket and a lid plate for closing the opening of the jacket so that a disc accommodated within the jacket does not slip outside, to enlarge the opening of the jacket, and a mechanism which rides over the lid plate to clamp the disc, as in the above described embodiment of the invention. The present invention may be reduced into practice in a reproducing apparatus of a different type from that in the above embodiment of the invention, for example, in a reproducing apparatus which operates together with a jacket and a frame member or tray having an annular holding part which is accommodated within the jacket together with a disc, and loads the disc into the reproducing apparatus together with the frame member or tray, by clamping the above frame member or tray and pulling the jacket outside the reproducing apparatus.

Further, this invention is not limited to these embodiments but various variations and modifications may be made without departing from the scope of the invention.

What is claimed is:

1. A reproducing apparatus for reproducing a disc-shaped recording medium which is accommodated within a case, said case comprising a jacket which has a space for accommodating said disc-shaped recording medium and an opening for allowing said disc-shaped recording medium to go in and out of said jacket, and a lid member inserted through said opening of said jacket for closing said opening of said jacket, said lid member having cutouts and ride-over parts, said reproducing apparatus comprising:

an inserting opening through which said case is inserted;

a turntable for rotating said disc-shaped recording medium;

clamping means for clamping at least one of said disc-shaped recording medium and said lid member provided at an innermost part on the opposite side from said inserting opening with respect to said turntable;

detecting means for detecting whether said disc-shaped recording medium is loaded within said reproducing apparatus;

a reproducing transducer for reproducing the disc-shaped recording medium placed on said turntable;

reproducing operation means for moving said reproducing transducer from a waiting position to a reproducing position with respect to the disc-shaped recording medium to perform a reproducing operation; and operating means connected to said detecting means and said reproducing operation means and operated upon starting of the reproducing operation, for operating said reproducing operation means only when operated in a state where said detecting means is detecting whether a disc-shaped recording medium is loaded within said reproducing apparatus.

2. A reproducing apparatus as claimed in claim 1 in which said detecting means is a detecting switch which detects the side of the loaded disc-shaped recording medium which is to be reproduced, and said operating means has an operation switch connected in series with said detecting switch with respect to a power source and circuit means for close-circuiting said reproducing operation means to said power source when both said detecting switch and said operation switch are closed.

3. A reproducing apparatus as claimed in claim 2 in which said reproducing operation means comprises a motor for moving said reproducing transducer, and said circuit means comprises a transistor connected in series with said motor with respect to said power source and having the base connected to said operation switch.

4. A reproducing apparatus as claimed in claim 1 in which:

said lid member is provided with a cutout on the front surface at a position deviated from the central part thereof;

said detecting means has a first detecting switch which enters within the cutout of said lid member upon loading of said disc-shaped recording medium with one side as the side which is to be reproduced, and a second detecting switch which enters within the cutout of said lid member upon loading of said disc-shaped recording medium with the other side as the side which is to be reproduced, said first and second detecting switches being connected in parallel with respect to said power source; and said operating means has an operation switch connected in series with the parallel connection detecting switches with respect to said power source, and circuit means for close-circuiting said reproducing operation means to said power source when both said operation switch and either one of the first and second detection switches are closed.

5. A reproducing apparatus as claimed in claim 1 in which said detecting means further comprises first and second display means respectively connected in series with said first and second detecting switches.

* * * * *